US010523008B2

(12) United States Patent
Rive et al.

(10) Patent No.: US 10,523,008 B2
(45) Date of Patent: Dec. 31, 2019

(54) SCALABLE HIERARCHICAL ENERGY DISTRIBUTION GRID UTILIZING HOMOGENEOUS CONTROL LOGIC

(71) Applicant: Tesla, Inc., Palo Alto, CA (US)

(72) Inventors: Peter Rive, San Francisco, CA (US); Eric Daniel Carlson, San Mateo, CA (US)

(73) Assignee: Tesla, Inc., Palo Alto, CA (US)

( * ) Notice: Subject to any disclaimer, the term of this patent is extended or adjusted under 35 U.S.C. 154(b) by 1057 days.

(21) Appl. No.: 14/802,811

(22) Filed: Jul. 17, 2015

(65) Prior Publication Data

US 2016/0248255 A1 Aug. 25, 2016

Related U.S. Application Data

(60) Provisional application No. 62/119,925, filed on Feb. 24, 2015.

(51) Int. Cl.
*H02J 3/38* (2006.01)
*G05B 15/02* (2006.01)
*G06Q 50/06* (2012.01)
*G06Q 10/06* (2012.01)

(52) U.S. Cl.
CPC .............. *H02J 3/383* (2013.01); *G05B 15/02* (2013.01); *G06Q 10/063* (2013.01); *G06Q 50/06* (2013.01); *G05B 2219/2639* (2013.01); *Y02E 40/76* (2013.01); *Y04S 10/545* (2013.01)

(58) Field of Classification Search
None
See application file for complete search history.

(56) References Cited

U.S. PATENT DOCUMENTS

| 8,543,246 | B2* | 9/2013 | Yuen ........................ H02J 3/06 700/286 |
| 8,825,217 | B2* | 9/2014 | Borrett .................. G06Q 10/06 700/295 |
| 8,868,247 | B2* | 10/2014 | Shaffer ................. G06Q 50/06 700/291 |
| 9,270,118 | B2* | 2/2016 | Carlson ............ H01L 31/02021 |
| 9,691,030 | B2* | 6/2017 | Micali ...................... G06N 5/04 |
| 9,804,623 | B2* | 10/2017 | Ansari ...................... H02J 3/46 |
| 9,887,545 | B2* | 2/2018 | Bamberger ............... H02J 3/12 |
| 9,926,852 | B2* | 3/2018 | Tiwari ...................... F02C 9/00 |
| 10,261,478 | B2* | 4/2019 | Ogawa ................... G05B 13/02 |

(Continued)

*Primary Examiner* — Jennifer L Norton
(74) *Attorney, Agent, or Firm* — Kilpatrick Townsend & Stockton LLP

(57) ABSTRACT

Techniques are disclosed for implementing a scalable hierarchical energy distribution grid utilizing homogeneous control logic are disclosed that provide distributed, autonomous control of a multitude of sites in an energy system using abstraction and aggregation techniques. A hierarchical energy distribution grid utilizing homogeneous control logic is provided that includes multiple control modules arranged in a hierarchy. Each control module can implement a same energy optimization scheme logic to directly control site energy resources and possibly energy resources of sites associated with control modules existing below it in the hierarchy. Each control module can act autonomously through use a similar set of input values to the common optimization scheme logic.

7 Claims, 10 Drawing Sheets

(56) References Cited

U.S. PATENT DOCUMENTS

| | | | |
|---|---|---|---|
| 2009/0093916 A1* | 4/2009 | Parsonnet | F24F 5/0017 |
| | | | 700/286 |
| 2012/0271476 A1* | 10/2012 | Parsonnet | F24F 5/0017 |
| | | | 700/295 |
| 2014/0070756 A1* | 3/2014 | Kearns | H02J 7/007 |
| | | | 320/101 |
| 2014/0094983 A1* | 4/2014 | Dykeman | H02J 4/00 |
| | | | 700/295 |
| 2014/0094984 A1* | 4/2014 | Dykeman | H02J 4/00 |
| | | | 700/295 |
| 2014/0214220 A1* | 7/2014 | Kamel | G05F 1/66 |
| | | | 700/291 |
| 2015/0149249 A1* | 5/2015 | Mansfield | G06Q 30/0205 |
| | | | 705/7.31 |
| 2016/0197474 A1* | 7/2016 | Aisu | H02J 3/14 |
| | | | 700/297 |
| 2016/0294215 A1* | 10/2016 | Kudo | H02J 3/32 |
| 2016/0301210 A1* | 10/2016 | Bamberger | G06Q 50/06 |
| 2017/0310161 A1* | 10/2017 | Tokunaga | H02J 13/0079 |
| 2018/0278083 A1* | 9/2018 | Andre | H02J 1/10 |
| 2019/0181641 A1* | 6/2019 | de Hoog | H02J 3/32 |
| 2019/0199129 A1* | 6/2019 | Kobayashi | H02J 3/14 |
| 2019/0199131 A1* | 6/2019 | Nakamura | H01M 8/04858 |
| 2019/0235556 A1* | 8/2019 | ElBsat | G05F 1/66 |

\* cited by examiner

SCALABLE HIERARCHICAL ENERGY DISTRIBUTION GRID UTILIZING HOMOGENEOUS CONTROL LOGIC

CROSS REFERENCE TO RELATED APPLICATIONS

The present application claims the benefit of U.S. Provisional Application No. 62/119,925, filed Feb. 24, 2015, which is hereby incorporated by reference in its entirety for all purposes.

FIELD

Embodiments of the invention relate to the field of energy systems; and more specifically, to a scalable hierarchical energy distribution grid utilizing homogeneous control logic.

BACKGROUND

Recently, the installation of energy generation systems (e.g., systems that generate energy using renewable resources such as solar, wind, hydropower, etc.) at residential and non-residential sites has proliferated for various climate, cost, stability, security, and political reasons. One large segment of installed energy generation systems involves solar photovoltaic (PV) systems.

Many installed PV systems can be directly or indirectly connected to utility-maintained electrical grids (e.g., via a site's main panel/main line), and may thus be referred to as "grid-connected" systems. Grid-connected energy generation systems beneficially allow site loads to be serviced in whole or in part from the grid at various times. For example, during evening hours when a PV system cannot generate substantial amounts of energy due to lack of sunlight, a site may draw some or all of its energy from the grid. In some configurations, grid-connected energy generation systems can also allow excess energy generated at the site to be fed back to the grid (and used/stored by others), such as when generated PV energy production may exceed a site's local energy load/use.

However, a limitation with many grid-connected energy generation systems is that, unlike a traditional power plant, the system power output may be intermittent and non-dispatchable. For example, a grid-connected PV system is typically limited in its ability to provide power capacity at times of peak grid loads, balance grid voltage and frequency variability, and/or supply energy when prices are most economic.

To address these and other limitations, some systems have been developed that integrate grid-connected energy generation (e.g., PV) components with an on-site energy storage subsystem, such as a battery device and a battery inverter/charger. In these integrated systems, the energy storage subsystem can be configured to store excess energy as it is generated by the PV components, and possibly dispatch stored energy to satisfy local (or external, grid-wide) loads as needed. Additionally, energy storage capability enables a number of other features that can provide benefits to the site owner or the service provider of the system, such as the ability to "time shift" energy usage to minimize the need to pull energy from the grid, and thus reduce energy costs.

However, energy generation and/or storage systems are largely unable to flexibly adapt to changing conditions specific to the site, nearby sites, region, grid, etc. Accordingly, currently site loads and generators are largely uncontrolled, and at best are operated according to a schedule to provide what is guessed or hoped to be an efficient scheme. However, in reality many use cases would require some sort of additional coordination in real-time between resources—at a site, or perhaps among multiple sites—to actually achieve the desired results. For example, on a cloudy day, energy from a storage system could potentially be dispatched to avoid a demand spike placed upon the grid.

Despite the advantages associated with integrating grid-connected PV energy generation with on-site energy storage, there are a number of challenges that make it difficult to efficiently deploy and control such integrated systems, particularly on a large, distributed scale. For example, it is tremendously difficult to attempt to control large numbers of energy generation and/or storage systems installed at various sites (in various geographic locations) utilizing differing device types that may have different capabilities, differing grid requirements, differing weather conditions, differing energy pricing schemes, etc.

Accordingly, there is a need for efficient, intelligent, adaptive control systems for energy generation and/or storage systems.

SUMMARY

The present disclosure relates generally to energy systems, and more specifically, to a scalable hierarchical energy distribution grid utilizing homogeneous control logic. Techniques are disclosed that allow for distributed, autonomous control of a multitude of sites in an energy system using abstraction and aggregation techniques for simplified yet powerful system control to achieve energy goals.

Accordingly, in some embodiments, a scalable hierarchical energy distribution grid utilizing homogeneous control logic is provided. The energy distribution grid can include multiple control modules arranged in a hierarchy, each of which implements a same energy optimization scheme logic. Each control module in the hierarchy can autonomously implement the same energy optimization scheme logic, reducing implementation and configuration complexities and any need for large-scale communications or reporting. Some or all of the control modules can directly control energy resources (e.g., generation devices, storage devices, load devices, etc.) at an associated site according to the optimization scheme logic.

In some embodiments, each control module can act independently (or "autonomously") through use a similar set of input values to the common optimization scheme logic to thereby control energy resources at an associated site.

In some embodiments, each control module interacts with one level of control modules above and/or below the control module, and may not need to see (or even be aware of) details of or data related to other control modules at further levels up or down in the hierarchy. For example, a child control module's optimization scheme logic can utilize its local EG value, load value, and storage value, while its parent can consider the aggregate EG value, aggregate load value, and aggregate storage value for all of its immediate child control modules in the hierarchy.

Moreover, some embodiments utilize abstraction techniques so that a control module need not be aware of details of other control modules (or sites) in the hierarchy, and can instead be aware of local, site-specific details and/or data from control modules directly connected to it in the hierarchy.

In some embodiments, the hierarchy of control modules can be scaled indefinitely, as each control module can be configured to only consider data from its corresponding site, one level up in the hierarchy (e.g., parent control module control signals), and/or one level downstream in the hierarchy (e.g., child control module data), allowing for the optimization scheme logic to be simplified, easily developed, and rapidly executed. This can allow the optimization scheme logic to react to changing conditions quickly and with minimal processing/networking overhead.

In some embodiments, each control module can implement a same optimization scheme logic configured to target a common goal. For example, the optimization scheme logic can be configured to, based upon the set of input values, control energy devices at the corresponding site to adjust a net load of the site (e.g., a power curve) such that it is as "flat" and "low" as possible. The optimization scheme logic can also be configured to only flatten the net load of the site, only target a "low" net load of the site, or place varying degrees of weight/importance upon these factors in determining how to control the site's energy devices.

The optimization scheme logic can also be configured to, based upon the set of input values, control energy devices at the corresponding site to adjust the energy profile (e.g., load/storage/generation) of the site based upon grid energy pricing data such that the net cost of energy taken from the grid at the site is minimized. Accordingly, the optimization scheme logic can be configured to cause energy to be taken from the grid, if needed, during relatively inexpensive or "low-demand" times, and/or dispatched to the grid during relatively "in-demand" times (from the perspective of the grid).

The foregoing, together with other features and embodiments will become more apparent upon referring to the following specification, claims, and accompanying drawings.

DETAILED DESCRIPTION

Figure 1:
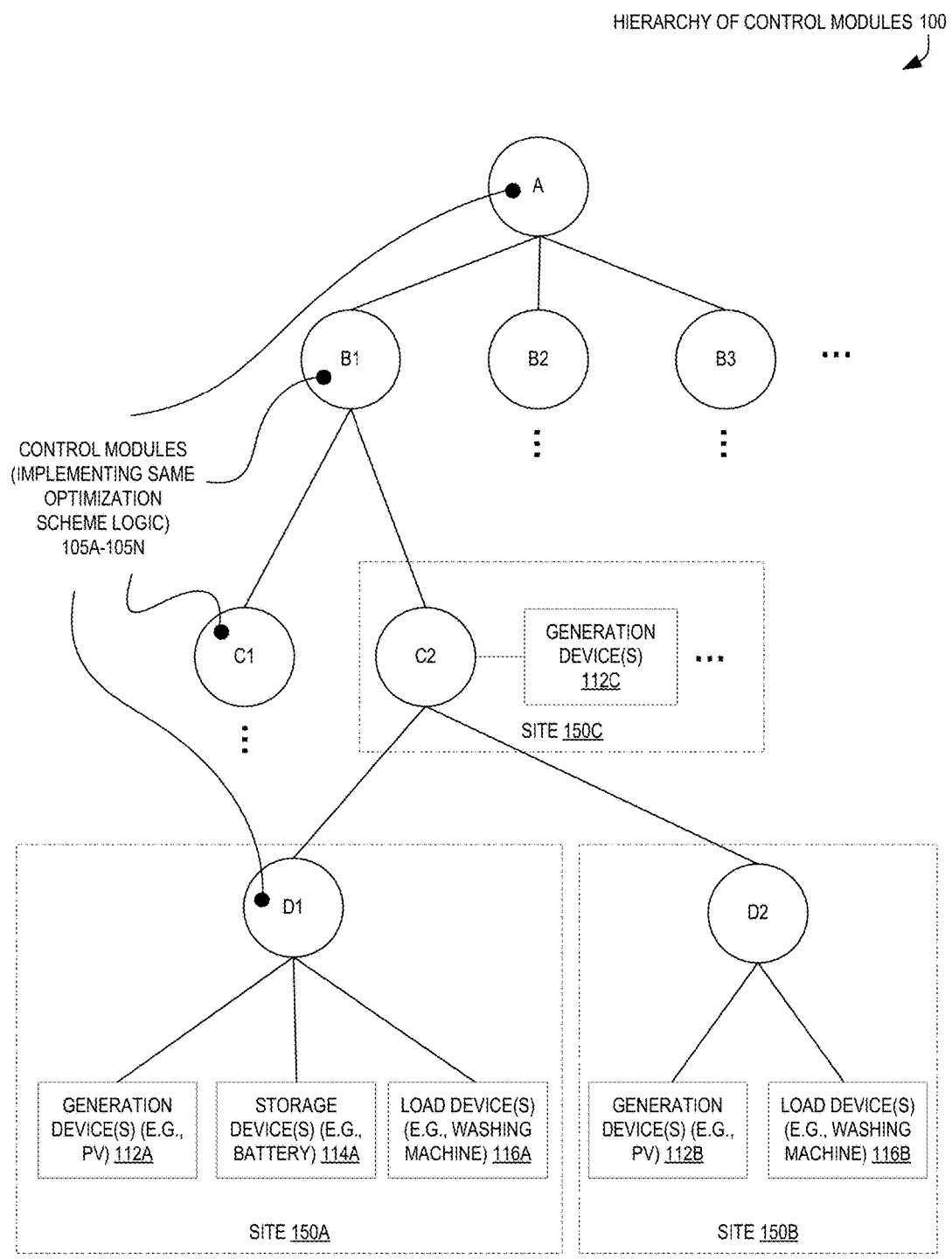
FIG. 1 shows a simplified high-level hierarchy of control modules of an energy distribution grid utilizing homogeneous control logic according to some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

One approach to implementing a control system for multiple energy resources at multiple sites may include configuring each site (e.g., each device at each site, for example) to communicate with a centralized control server. Such a control server could be configured to control the energy generation, storage, etc., at each individual site to manage resources in the entire grouping of energy generation/storage sites. However, as the network continues to expand, the control server would require higher and higher levels of bandwidth to track data from all connected devices at all connected sites, such as the real-time (RT) energy generation, RT load requirements, RT storage capabilities, etc., for each site in the grid.

Such a configuration, with a continued addition of controlled sites, may be computationally expensive and difficult to reliably manage. Moreover, the control server may suffer from latency problems created by huge numbers of communications with huge numbers of devices over a limited bandwidth channel.

Additionally, the control server may be required to be able to communicate using a variety of protocols to be able to connect with potentially multiple types of devices from potentially multiple providers. As a variety of different types of energy system devices (e.g., inverters, batteries, controllable loads, PV devices, etc. of various makes and models) may be present across the different sites. Such end devices implement numerous protocols and behaviors, offering heterogeneous interfaces for communications purposes.

Accordingly, in certain embodiments, a scalable hierarchical energy distribution grid utilizing homogeneous control logic is provided. The energy distribution grid includes multiple control modules arranged in a hierarchy, each of which implements a same energy optimization scheme logic. Each control module in the hierarchy can autonomously implement the same energy optimization scheme logic, reducing implementation and configuration complexities and any need for large-scale communications or reporting. Some or all of the control modules can directly control energy resources (e.g., generation devices, storage devices, load devices, etc.) at a site according to the optimization scheme logic.

In some embodiments, each control module can act independently (or "autonomously") through use a similar set of input values to the common optimization scheme logic to thereby control energy resources at an associated site.

In some embodiments, an optimization scheme logic of a "leaf" control module in the hierarchy (e.g., a control module of a site including energy resources and not serving as a parent to any other control module) can utilize a total energy generation (EG) value of the site as a first input, a total load value as a second input, a total storage capacity as a third input. The optimization scheme logic can also utilize energy price data from a price signal as an input.

In some embodiments, a "parent" control module (e.g., a control module configured as a "parent" to one or more other control modules in the hierarchy) can use similar inputs to the same optimization scheme logic. However, these inputs can be based upon "aggregate" data from the sites of the corresponding child control modules. In some embodiments, a parent control module optimization scheme logic can use an aggregate EG value of the "child" control module sites as a first input, an aggregate load value of the child control module sites as a second input, an aggregate storage value of the child control module sites as a third input, etc. In some embodiments, the parent control module optimization scheme logic can use energy price data from a price signal as an input.

In some embodiments, each parent control module only "sees" (is aware of) one level of control modules above and/or below the parent control module, and may not need to see (or even be aware of) details of or data related to other control modules at further levels up or down in the hierarchy. For example, a child control module's optimization scheme logic can utilize its local EG value, load value, and storage value, while its parent can consider the aggregate EG value, aggregate load value, and aggregate storage value for all of its immediate child control modules in the hierarchy.

Moreover, some embodiments benefit from an application of abstraction, wherein a control module need not be aware of details of other control modules (or sites) in the hierarchy, and can instead focus upon local, site-specific details and/or data from control modules directly connected to it in the hierarchy.

Accordingly, embodiments can theoretically be scaled indefinitely, as each control module can be configured to only consider data from its corresponding site, one level up in the hierarchy (e.g., parent control module control signals), and/or one level downstream in the hierarchy (e.g., child control module data), allowing for the optimization scheme logic to be simplified, easily developed, and rapidly executed. Thus, the optimization scheme logic may react to changing conditions quickly and with minimal processing/networking overhead.

In some embodiments, each control module can implement a same optimization scheme logic configured to target a common goal. For example, the optimization scheme logic can be configured to, based upon the set of input values, control energy devices at the corresponding site to adjust a net load of the site (e.g., a power curve) such that it is as "flat" and "low" as possible. Flat energy loads are beneficial for the site and the grid as a whole, as flat loads are predictable and do not have energy "spikes" that can cause the grid (or site resources) to suffer from demand exceeding supply, which can lead to supply problems such as brown-outs and/or hardware problems in the system. Moreover, "low" net loads are beneficial for the site and the grid as a whole, as it indicates a smaller amount of energy demand, thereby reducing the amount of energy required from the grid and the associated cost to the site. The optimization scheme logic can also be configured to only flatten the net load of the site, only target a "low" net load of the site, or place varying degrees of weight/importance upon these factors in determining how to control the site's energy devices.

As another example, the optimization scheme logic can be configured to, based upon the set of input values, control energy devices at the corresponding site to adjust the energy profile (e.g., load/storage/generation) of the site based upon grid energy pricing data such that the net cost of energy taken from the grid at the site is minimized. Accordingly, the optimization scheme logic can be configured to cause energy to be taken from the grid, if needed, during relatively inexpensive or "low-demand" times, and/or dispatched to the grid during relatively "in-demand" times (from the perspective of the grid).

For purposes of illustration, several of the examples and embodiments that follow are described in the context of energy generation, consumption and/or storage (EGS) systems that use solar PV technology for energy generation and battery technology for energy storage. However, it should be appreciated that embodiments of the present invention are not limited to such implementations. For example, in some embodiments, alternative types of energy generation technologies (e.g., wind turbine, solar-thermal, geothermal, biomass, hydropower, etc.) may be used. In other embodiments, alternative types of energy storage technologies (e.g., compressed air, flywheels, pumped hydro, superconducting magnetic energy storage (SMES), etc.) may be used. One of ordinary skill in the art will recognize many modifications, variations, and alternatives.

FIG. 1 shows a simplified high-level hierarchy 100 of control modules of an energy distribution grid utilizing homogeneous control logic according to some embodiments. The depicted hierarchy 100 of control modules depicts four levels of control modules 105A-105N. In various embodiments there can be more levels or fewer levels, as well as more control modules (e.g., tens, hundreds, thousands, tens of thousands, millions, etc.) or fewer control modules (e.g., two, three, etc.). Moreover, the use of the suffix "N" in 105N is not meant to indicate a particular number of control modules, only that there may be multiple such control modules—e.g., two, five, ten, one hundred, one thousand, one million, etc.

Throughout this description, the concept of a hierarchy is presented with regard to configurations of relationships between and/or roles of control modules. Thus, the described control modules in a hierarchy, can be viewed as somewhat analogous to "nodes" of a "tree" as used in the fields of computer science and/or mathematics. Thus, the hierarchy may refer to a collection of control modules having "levels" or "generations" of control modules, where a "parent" control module might be associated with one or more "child" control modules. A control module can potentially be only a parent control module (e.g., a "root" control module in the hierarchy), both a parent and a child control module (e.g., a mid-level control module), or only a child control module (e.g., a "leaf" control module in the hierarchy not having any children).

Although particular references are made herein to certain control modules as being either a "parent" or a "child", these references are not meant to mean that the control module is exclusively either a parent or child unless otherwise indicated by the context of use. Thus, a reference to a "parent" control module can be made where appropriate for ease of discussion, and the control module may or may not also be a "child" control module to a different "parent" control module.

In certain embodiments a "child" control module can have precisely one "parent" and zero or more "children," and a "parent" control module can have zero or one "parents" and one or more "children." However, in other embodiments the defined rules can be configured differently. For example, in some embodiments a "child" or "parent" control module can have multiple "parents."

The embodiment depicted in FIG. 1 is merely one example and is not intended to unduly limit the claimed embodiments of the present invention. Thus, one of ordinary skill in the art would recognize many possible variations, alternatives, and modifications to this illustrated hierarchy 100. For example, there may be more or fewer control modules 150, levels in the hierarchy, and/or energy resources than shown in FIG. 1. As another example, some embodiments include at least two levels of control modules in the hierarchy, where at least one control module serves as a parent to at least one control module serving as a child in the hierarchy.

As another example, in some embodiments the control modules need not be arranged in a hierarchy. For example, the control modules can be arranged using (or including aspects of) a mesh configuration (fully connected, partially connected, etc.), flat configuration, star configuration, ring configuration, hybrid configuration, etc. Thus, using the accompanying disclosure, it should be possible to implement the disclosed features in a variety of topologies, and thus various embodiments are not limited to only hierarchical configurations.

In some embodiments, a level in the hierarchy may correspond to a particular level or granularity of an energy distribution system. For example, control modules 'D1' and 'D2' may correspond to individual homes, control modules 'C1' and 'C2' may correspond to particular energy substations, control modules 'B1'-'B3' may correspond to distribution regions (e.g., cities, counties, etc.), control module 'A' may correspond to some or all of a state, etc.

FIG. 1 illustrates a control module 'C2' at site 150C, which includes one or more energy generation devices 112C. Control module 'C2' can be referenced as a parent to control module 'D1' and control module 'D2', which can be referenced as children to control module 'C2'. Control module 'D1' is illustrated as being associated with site 150A, which includes several controllable energy resources—one or more energy generation devices 112A (e.g., PV panels, gas generators, windmills, etc.), one or more energy storage devices 114A (e.g., batteries, water heaters), and one or more load devices 116A (e.g., a washing machine, heating and/or air conditioner unit, refrigerator, etc.). Site 150A can be a building such as a home or business, a collection of buildings, or any geographic space having controllable energy resources. Control module 'D1', which is associated with site 150A, may be physically at the site 150A or geographically remote from the site 150A but configured to control the energy devices at the site 150A.

Similarly, control module 'D2' is illustrated as being associated with site 150B, which is depicted as including generation devices 112B and load devices 116B.

In the illustrated hierarchy 100 of control modules 105A-105N, each of the control modules 105A-105N may be configured to implement a same optimization scheme logic. The optimization scheme logic may utilize a set of locally-determined (e.g., determined by the implementing control module) input values to determine whether (and how) to control one or more devices at the corresponding site to attempt to achieve an energy goal.

For example, the control module 'D1'—which acts as a child of control module 'C2' in the hierarchy 100—can be configured to determine an energy generation value of the site 150A, an energy storage value of the site 150A, and a load value of the site 150A. These determined values can be used as a set of input values for the optimization scheme logic.

Control module 'D1' can, in some embodiments, determine an energy generation value of the site 150A by communicating with (or monitoring) energy generation devices 112A—such as a photovoltaic inverter, perhaps using wireless communication techniques such as Bluetooth, ZigBee, or WiFi—to determine how much energy is being generated at a point in time. Similarly, control module 'D1' can, in some embodiments, determine an energy storage value by communicating with a storage device 114A to determine a storage rate, current storage amount/utilization, and/or current storage capability. Control module 'D1', in some embodiments, can determine a current load value of the site 150A by monitoring a flow of energy through wiring at the site 150A (or communicating with a device that monitors a flow of energy through wiring) and/or communicating with one or more load devices 116A that can report usage information.

Control module 'D1' can utilize these determined values as input values into the optimization scheme logic, which may determine whether an energy generation excess or deficiency exists, whether energy storage is occurring (e.g., at what rate) and/or may continue to occur (e.g., whether excess storage capacity exists and how much exists), and/or whether a site load exists and/or will increase or decrease. Accordingly, depending upon the particular configured optimization scheme logic and its configured energy goal, control module 'D1' can communicate with one or more of the energy generation devices 112A, energy storage devices 114A, and/or load devices 116A to change an energy profile of the site 150A according to the energy goal.

For example, if control module 'D1' determines that a current energy generation rate exceeds a site load, the optimization scheme logic of the control module 'D1' may be configured to control the storage device(s) 114A to store some or all of the excess generated energy, and/or control load device(s) 116A to increase the load (and thus possibly decrease a later-expected load), control the generation device(s) 112A to either stop generation or cause excess energy to be fed back to the grid. Of course, many other site-specific energy scenarios may exist and cause the optimization scheme logic of the control module 'D1' to control devices differently to achieve (or attempt to achieve) an energy goal.

Similarly, control module 'D2' may determine and use its own local input values for the optimization scheme logic. These values may be similar to those discussed with regard to control module 'D1'. However, as site 150B does not include any energy storage device(s), a determined energy storage value of the site 150B (e.g., a storage capacity, an available storage capacity, a storage rate, etc.) may be zero.

In some embodiments, parent control modules may similarly determine local input values for the same optimization scheme logic. Control module 'C2', for example, is depicted as being a parent to control module 'D1' and control module 'D2'. Control module 'C2' may be configured to determine aggregate energy generation value (of site 150A and site 150B), an aggregate energy storage value (of site 150A and site 150B), and an aggregate load value (of site 150A and site 150B). These determined values can be used as a set of input values for the optimization scheme logic.

In some embodiments, control module 'C2' may locally determine some or all of these values based upon communications from sites 150A-150B (e.g., communicating with or receiving reporting messages from control module 'D1' and/or 'D2') and/or observing energy flows to/from these child control modules. For example, control module 'C2' may determine an aggregate load value (e.g., a sum of individual load values from sites 150A-150B) by measuring energy that may flow to/from sites 150A-150B as it passes through site 150C.

Depending upon the particular energy goal targeted by the optimization scheme logic and/or the determined input values, control module 'C2' may be configured to cause energy generated by generation devices 112C (e.g., a PV array) to be provided to one or both of control modules 'D1'-'D2'.

Of course, the illustrated control modules 105A-105N and sites are merely illustrative, and thus many different control modules at different hierarchy levels may include different energy resources than as depicted, and thus be able to control site-local devices differently based upon its determined input values for the optimization scheme logic.

For example, in some embodiments some or all of the control modules 105A-105N may determine energy price data, and use this energy price data as an input value into the optimization scheme logic. For example, control module 'D1' at site 150A may receive, from an electrical service provider, a price signal indicating a change in pricing, a time-based pricing scheme, an energy event, etc., which causes a price of energy provided from or to the electrical service provider (e.g., external energy system) to change. Thus, in some embodiments the optimization scheme logic may take into account energy pricing associated with taking energy from the grid or providing energy back to the grid when deciding how to target the energy goal.

Figure 2:
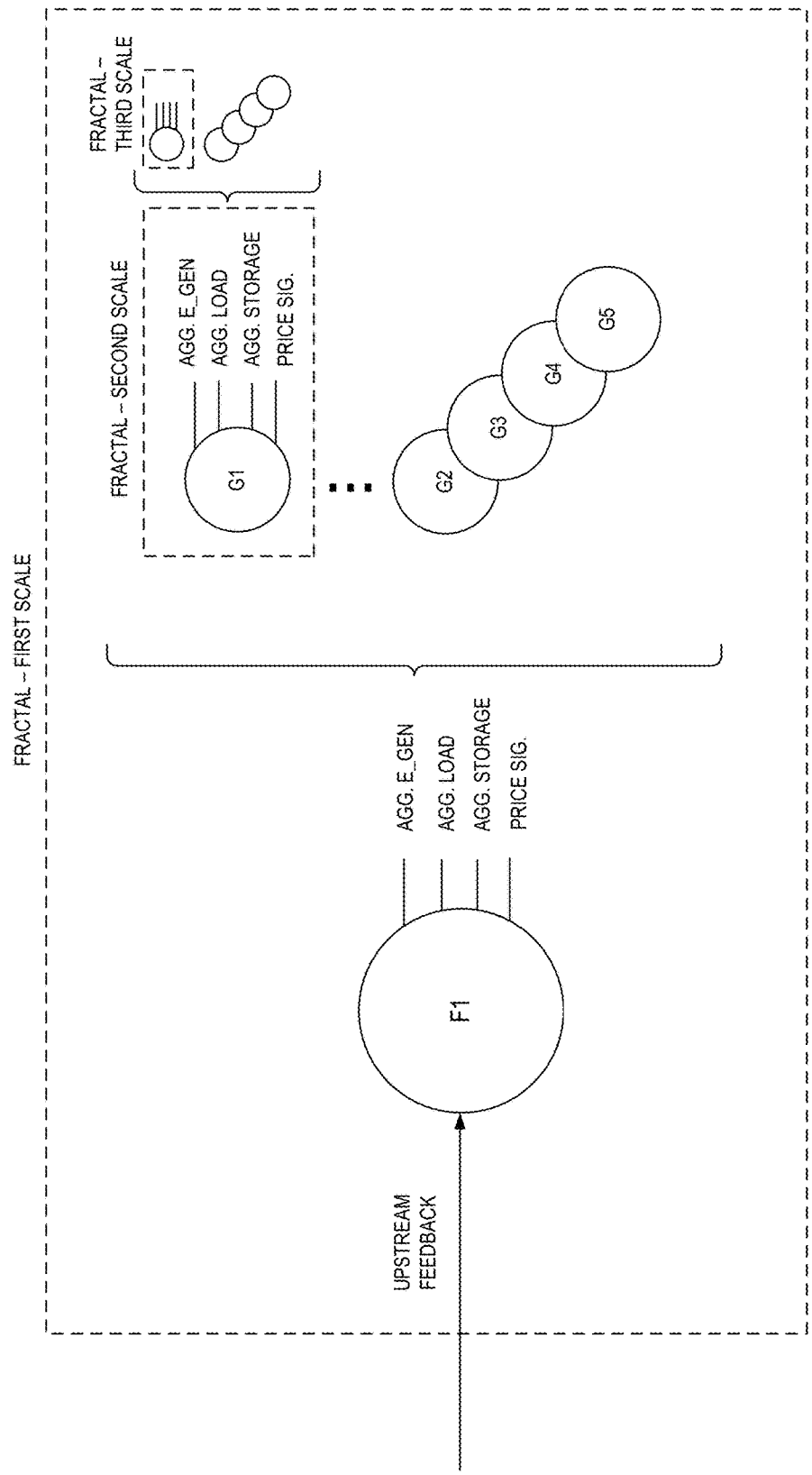
FIG. 2 shows a fractal nature of hierarchical control modules utilizing homogeneous control logic according to some embodiments.

FIG. 2 shows a block diagram 200 representing the fractal nature of hierarchical control modules utilizing homogeneous control logic according to some embodiments. The block diagram 200 includes a control module 'F1' serving as a parent in a hierarchy to control modules 'G1'-'G5'.

Parent control module 'F1' can determine an aggregate energy generation value, an aggregate load value, an aggregate storage value, and aggregate price signal data associated with child sites (associated with child control modules 'G1'-'G5'). These determined values may result of an addition (or another statistical measure such as average or standard deviation) of individual site-specific values. As illustrated, control module 'F1' may also incorporate similar upstream feedback provided by non-illustrated parent control modules.

This combination of parent control module 'F1' and its child control modules 'G1'-'G5' is illustrated as part of a common architecture that can repeat as the individual components are expanded in detail. Thus, this combination is a first scale of a fractal, as the focus upon one of the child control modules (here, control module 'G1') can repeat the architecture. For example, a second scale of the fractal involves control module 'G1', which may or may not itself act as a parent to other (non-illustrated) control modules, and similarly determine and utilize a set of input values (e.g., energy generation value, load value, storage value, price signal data value) for the same optimization scheme logic as implemented by control module 'F1'.

Figure 3:
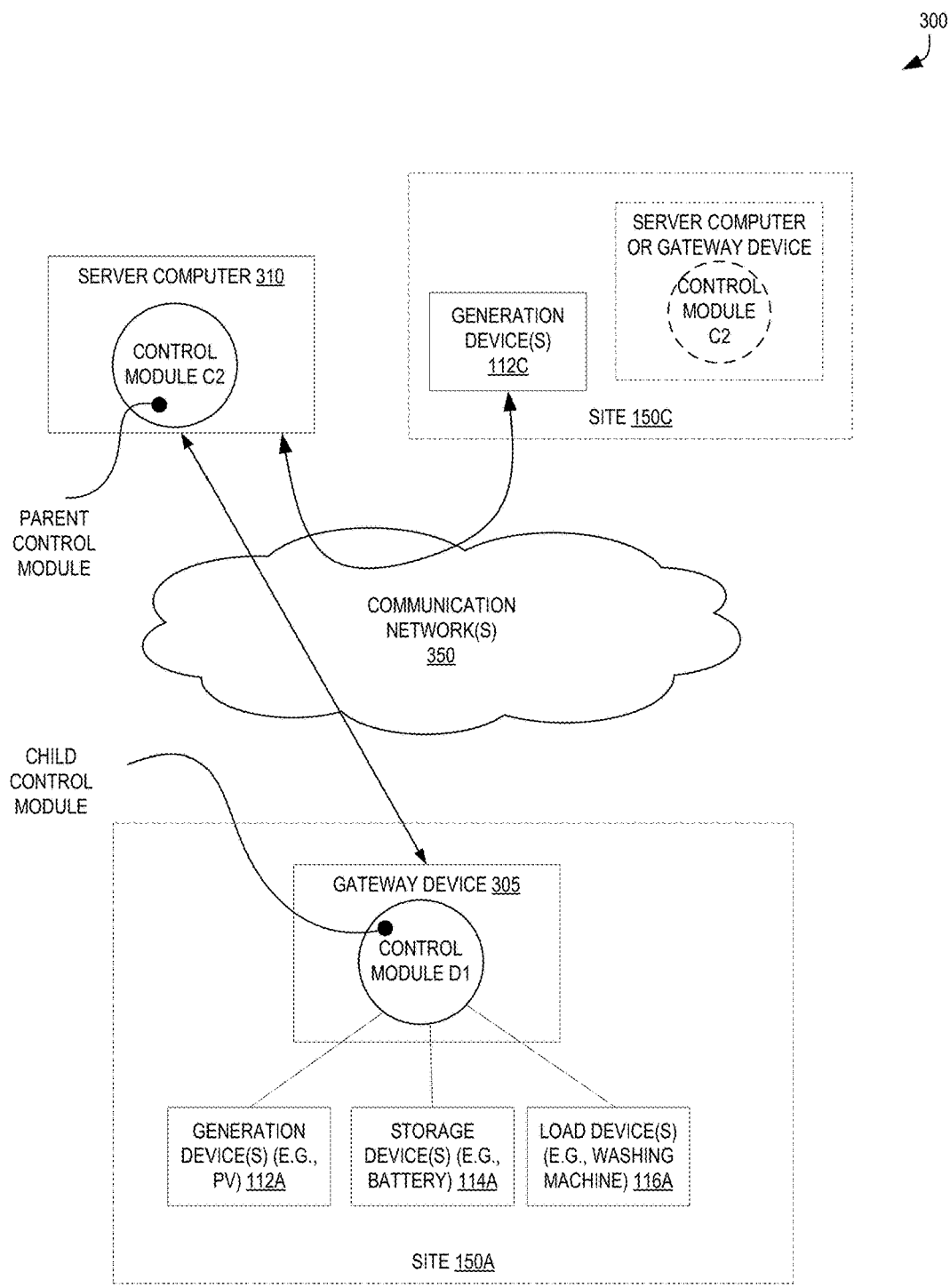
FIG. 3 shows exemplary sites and hardware-based configurations for implementing hierarchical control modules utilizing homogeneous control logic according to some embodiments.

FIG. 3 shows a block diagram 300 of exemplary sites and hardware-based configurations for implementing hierarchical control modules utilizing homogeneous control logic according to some embodiments. In FIG. 3, two control modules of a hierarchy are depicted.

A first control module 'D1' is depicted as part of a gateway device 305 that can be physically situated at site 150A along with generation device(s) 112A, storage device(s) 114A, and/or load device(s) 116A. In some embodiments, control module 'D1' is executed as a software module by gateway device 305, though in some embodiments control module 'D1' may be implemented as a combination of software and hardware or just hardware.

Control module 'D1' may be a child to control module 'C2' in the hierarchy, which is thus a parent control module. Control modules 'D1' and 'C2' may communicate over one or more communications networks 350, which may include private and/or public networks such as the Internet. In FIG. 3, control module 'C2' is illustrated as part of server computer 310, and in some embodiments is executed as a software module, though again it can be implemented as a combination of software and hardware or just hardware.

Server computer 310 is depicted as being separate from site 150C; however, control module 'C2' is still deemed as "associated" with site 150C, as it can be communicatively coupled with devices of the site 150C such as one or more energy generation device(s) 112C. However, control module 'C2' can also, in some embodiments, be physically present at site 150C, and be part of a server computer or gateway device, for example.

Figure 4:
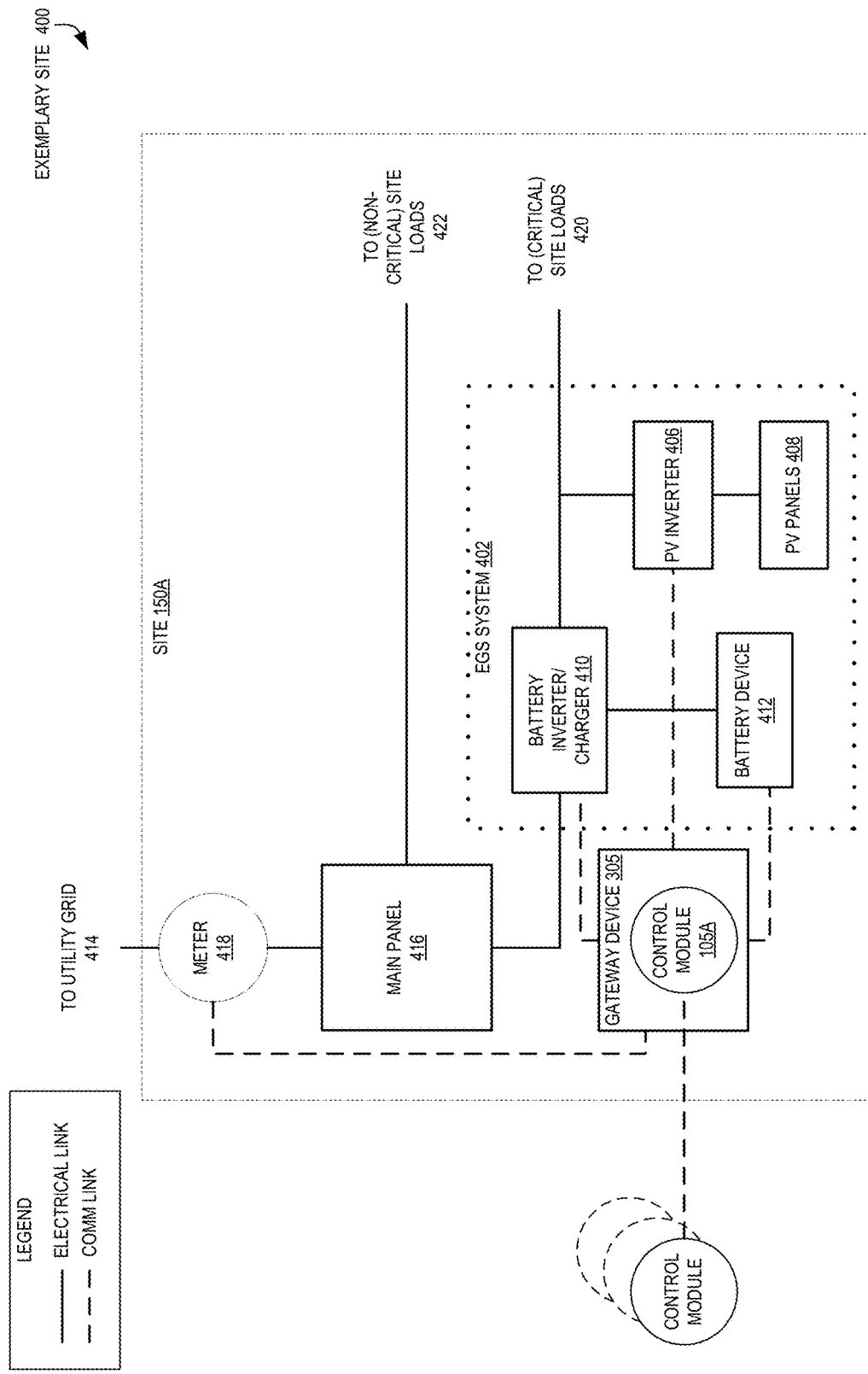
FIG. 4 shows an exemplary control module implemented using a site gateway and other site energy devices sites according to some embodiments.

FIG. 4 shows a simplified block diagram of a system 400 including an exemplary control module 105A implemented using a site gateway device 305 and other site energy devices sites according to some embodiments. As shown, system environment 400 includes an energy generation and storage (EGS) system 402 that is installed at site 150A (e.g., a residence, a commercial building, etc.). EGS system 402 includes a PV-based energy generation subsystem comprising a PV inverter 406 and one or more PV panels 408, which collectively can represent energy generation device(s) 112A. EGS system 402 also includes a battery-based energy storage subsystem comprising a battery inverter/charger 410 and a battery device 412, which collectively can represent energy storage device(s) 116A.

In some embodiments, PV inverter 406 and battery inverter/charger 410 can be combined into a single device. In the example of FIG. 4, EGS system 402 is grid-connected; thus, PV inverter 406 and battery inverter/charger 410 are electrically connected to the utility grid 414 via a main panel 416 and a utility meter 418. Further, to provide power to site 150A, utility grid 414, PV inverter 406, and battery inverter/charger 410 are electrically connected to critical site loads 420 and non-critical site loads 422 (e.g., representing energy load device(s) 114A).

As previously described, integrated EGS systems such as system 402 provide a number of advantages over energy generation systems that do not incorporate any on-site energy storage. For example, excess energy produced by PV components 406 and 408 can be stored in battery device 412 via battery inverter/charger 410 as a critical reserve. Battery inverter/charger 410 can then discharge this reserved energy from battery device 412 when utility grid 414 is unavailable (e.g., during a grid blackout) to provide backup power for critical site loads 420 until grid power is restored. As another example, battery device 412 can be leveraged to "time shift" energy usage at site 150A in a way that provides economic value to the site owner or the installer/service provider of EGS system 402. For instance, battery inverter/charger 410 can charge battery device 412 with energy from utility grid 414 (and/or PV inverter 406) when grid energy cost is low. Battery inverter/charger 410 can then dispatch the stored energy at a later time to, e.g., offset site energy usage from utility grid 414 when PV energy production is low/grid energy cost is high, or sell back the energy to the utility when energy buyback prices are high (e.g., during peak demand times).

As centralized management of EGS systems such as system 402 has proven to be difficult, particularly at the large scale needed for the residential and commercial markets, in some embodiments system environment 400 can include a site gateway 305 implementing control module 105A, which can control these energy operations using determined input values and optimization scheme logic as described herein.

Site gateway 305 can be a computing device (e.g., a general purpose personal computer, a dedicated device, etc.)

that is installed at site 150A. As shown, site gateway 305 is communicatively coupled with on-site components 406, 410, 412, and 418. Site gateway 305 can also be communicatively coupled with other control modules in the hierarchy via a communications network.

In some embodiments, site gateway 305 can be a stand-alone device that is separate from EGS system 402. In other embodiments, site gateway 305 can be embedded or integrated into one or more components of system 402.

Site gateway 305 can collect system operating statistics, such as the amount of PV energy produced (via PV inverter 406), the energy flow to and from utility grid 414 (via utility meter 418), the amount of energy stored in battery device 412, and so on. These statistics can be utilized as (or to generate) the input values for the optimization scheme logic of control module 105A.

According to embodiments, communication between the various elements involved in energy/power management (e.g., between the control module 105A and the various devices at the site 150A) may be achieved through wireless (e.g., Bluetooth, ZigBee, WiFi) or wired communications. In some embodiments, this communication can occur through use of a power management Message Bus System (MBS), which can facilitate communication between the various entities (e.g., on-site devices, user interface systems, logging systems, third party systems etc.) in a distributed energy generation and/or storage deployment. The MBS can operate according to a subscribe/publish model, with each respective device functioning as a subscriber and/or publisher, utilizing a topic of a message being communicated.

It should be appreciated that system environment 400 is illustrative and not intended to limit embodiments of the present invention. One of ordinary skill in the art will recognize many variations, modifications, and alternatives that can be utilized.

Figure 5:
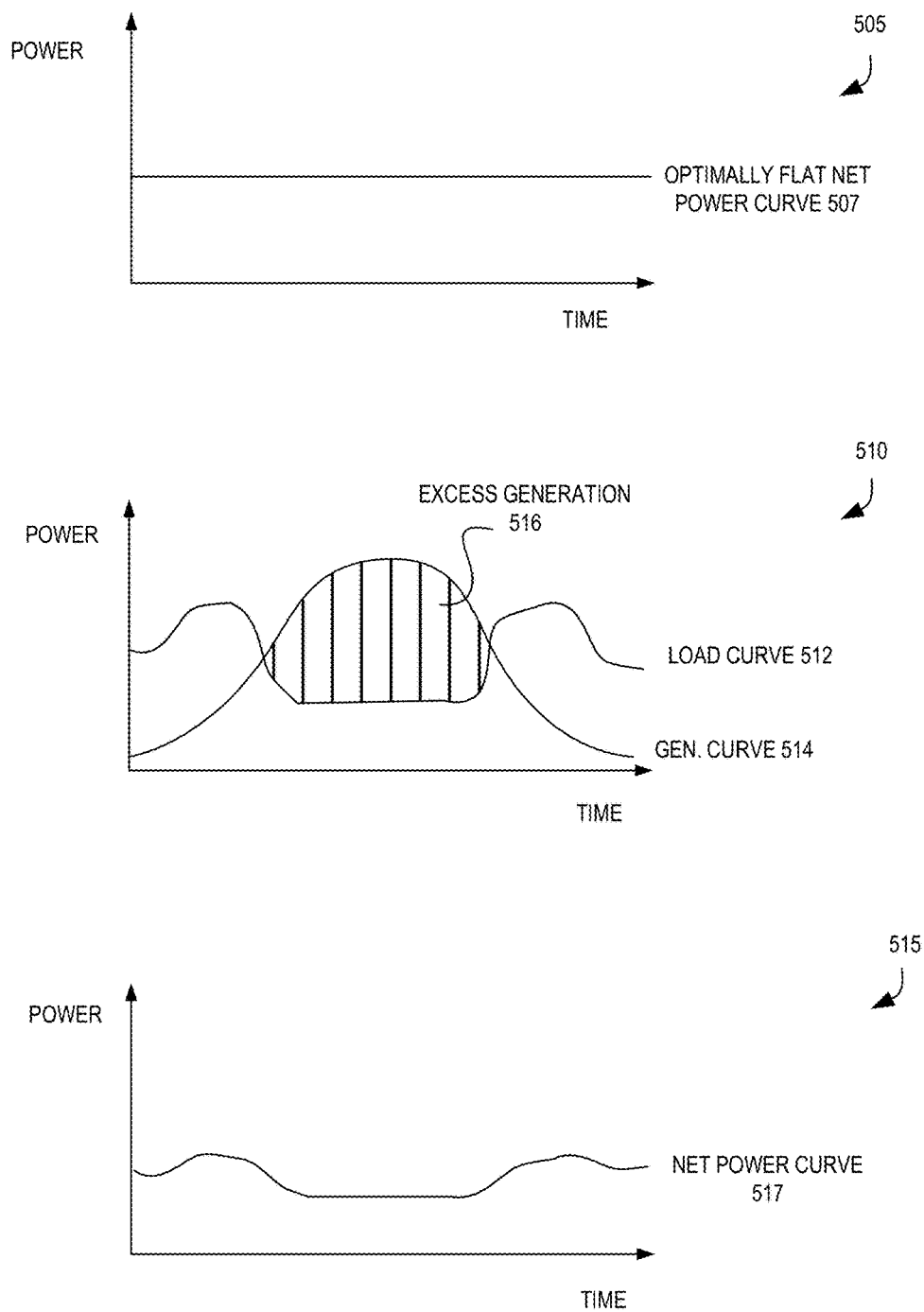
FIG. 5 shows an exemplary optimal net flow power curve, combined load and generation curves with excess generation, and an aggregate power curve according to some embodiments.

FIG. 5 shows an exemplary optimally flat net power curve graph 505, combined load and generation curves with excess generation graph 510, and an aggregate power curve graph 515 according to some embodiments.

As described above, the optimization scheme logic utilized by the various control modules can be configured to control devices to adjust an energy profile of the site according to a configured energy goal.

In some embodiments, the optimization scheme logic can target a configured energy goal of a flat net power curve 507, as represented by graph 505. This graph, with time on the x-axis (e.g., representing the course of a time period such as a day, etc.) and power on the y-axis (e.g., in kilowatts), which can indicate an amount of energy being taken from the grid from a particular site. This optimally flat net power curve 507, being flat, indicates a constant/continual draw of energy from the grid having no deviations (e.g., spikes). Accordingly, in some embodiments the optimization scheme logic utilized by the control modules may use the determined input values and control any of various site devices in an attempt to maintain as flat of a net power curve as possible given the factors/constraints/capabilities of the site. For example, the optimization scheme logic can be configured to cause generated energy to be stored during periods of over-generation, cause energy stored at the site to be used during periods where the site load would exceed the power draw of the net power curve, etc.

Turning to graph 510, an exemplary load curve 512 is illustrated with two peaks. The first peak might, for example, represent an increase in site load during morning hours, where people in a house might be utilizing a heating system, kitchen appliances, televisions, and the like. The middle portion of the load curve 512 then falls for a portion of day (e.g., such as when a house might be vacant and a relatively minimal and largely flat load exists from continued operation of a refrigerator, HVAC system, security system, etc.), and then rise again as the second peak in the evening hours. This second peak might, for example, represent a period of time where a family returns to the home, uses consumer electronics, kitchen appliances, additional heating/cooling, laundry, etc., before the late evening, where the load again flattens as people may sleep.

In contrast to this exemplary load curve 512, a site energy generation curve 514 is also depicted with one large peak at the middle of the graph. Such an exemplary generation curve 514 may result from a site utilizing PV energy generation, where energy is most created during the middle of the day when the sun may be most overhead and the PV system is capturing the most solar energy.

Accordingly, in the exemplary graph 510 the peaks of the load curve 512 and the generation curve 514 do not align, such that there is a period of excess generation 516 during the middle of the day and a period of excess utilization/load during the evening and morning.

Thus, in some embodiments, the optimization scheme logic can be configured to control site devices to cause the resulting net power curve (or, power draw from the external grid over time) to be maximally flat and/or low. For example, in some embodiments the optimization scheme logic can cause energy generated during periods of excess generation 516 to be stored in energy storage devices (e.g., batteries) to be used at the site during periods of excess utilization. Additionally, in some embodiments the optimization scheme logic can cause energy generated during periods of excess generation 516 to be stored in energy storage devices such as hot water heaters (to reduce the expected load during the times of excess utilization) and/or cause load devices to increase their load during this period of excess generation 516. For example, the optimization scheme logic of a site control module may cause an HVAC system to run during a period of excess generation 516 to heat/cool a residence (or building) in advance of the time when a person may return to the residence. Accordingly, the excess generated energy can be used to proactively perform tasks that ordinarily would be performed during periods of peak utilization, thereby reducing the need to perform those tasks later, which can flatten the utilization during those typical high-use periods.

As a result, through monitoring of site conditions (e.g., via determined optimization scheme logic input values and/or historical trend data of site input values), the control module may thus maximally flatten a resulting net power curve 517 of the site, as shown in graph 515. In this exemplary net power curve 517, the resulting net power curve 517 is much flatter than that shown in graph 510 as a result of the site device control from the control module. Thus, much smaller peaks exist during the morning and evening times of peak utilization, and a relatively flat mid-day utilization can result from the control module proactively increasing certain loads, as described above.

Figure 6:
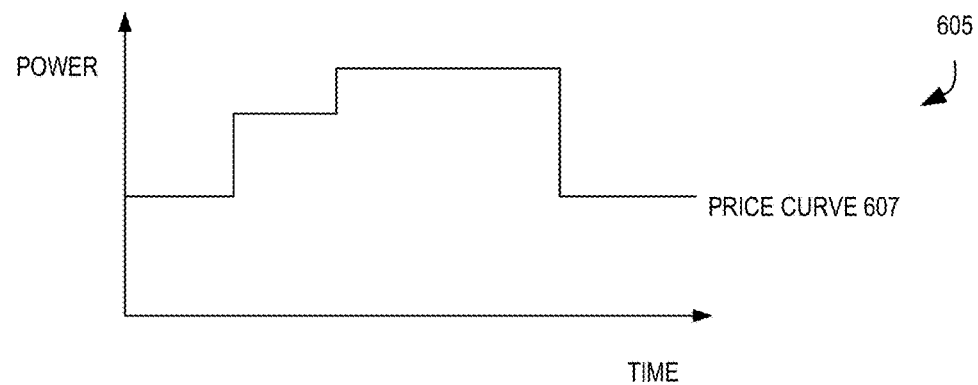
FIG. 6 shows an exemplary price curve and a price-optimized net power curve according to some embodiments.
Figure 6:
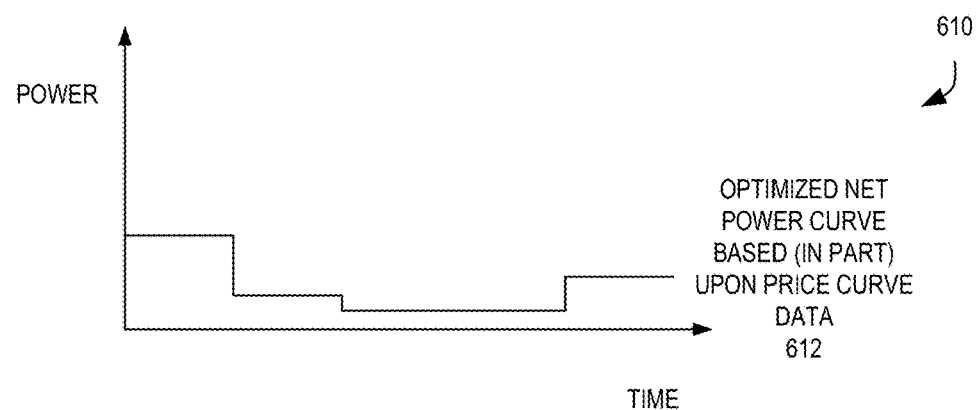

Of course, many different energy goals can flexibly be configured for the optimization scheme logic, thereby causing differently shaped net power curves 517 to result. For example, FIG. 6 shows an exemplary price curve graph 605 and a price-optimized net power curve graph 610 according to some embodiments.

As described earlier herein, one determined input for the optimization scheme logic of a control module may include energy pricing data, such as data from one or more price signals received from a grid energy provider. For example, as shown in graph 605, a grid energy provider may provide price signal data such that the cost of energy taken from the grid during different times differs. Price curve 607 illustrates one exemplary deviation of pricing in a stepwise manner. Of course, this stepwise price curve 607 is exemplary, and many different time-based pricing schemes are possible. Additionally, the price curve data 607 can also include or represent a cost of providing energy from the site to the grid, too.

Continuing the example, as shown price curve 607 is relatively low at the beginning and end of the graph (e.g., during early morning hours and late evening hours when energy demand is relatively low), higher during a mid-morning time period, and then the highest in the middle of the graph 605, perhaps during periods of heightened system-wide demand from businesses, etc.

Thus, in some embodiments the optimization scheme logic can be configured to target an energy goal of a minimal overall energy cost for the site of utilized grid-supplied energy. Such price curve data 607 can be thus be utilized by the optimization scheme logic, for example, to modify the site energy profile by increasing energy utilization at the site (e.g., take and store energy from the grid in a storage device, take energy from the grid and proactively/speculatively increase an energy load such as heating/cooling, etc.) during periods of lowest cost grid-supplied energy, and/or decreasing the use of grid-supplied energy as much as possible during periods of higher cost grid-supplied energy.

As a result of such an energy goal, the optimized net power curve 612 illustrated in graph 610 might result, which includes periods of higher utilization during the early morning and late evening, when grid-supplied energy has a least cost, and much lower utilization during the mid-day when grid-supplied energy has a highest cost.

Of course, as mentioned above, the price curve data 607 utilized as an input to the optimization scheme logic in some embodiments can also include different monetary results during different times for providing energy from the site back into the grid. Accordingly, an energy goal targeted by the optimization scheme logic may seek to provide energy back to the grid during periods where it is most beneficial to the site to reduce an overall energy cost to the site and/or even, potentially, maximize a profit resulting from such energy providing.

Hybrid approaches can be used that take advantage of both price signal opportunities and power storage resources. As indicated above, power can be routed back into the grid in response to a price signal. This may occur whether over-generation condition exists or not, based on near term or long term optimization goals. Also, power can also be stored in an energy storage device (e.g., battery) whether an over-generation condition exists or not. This does not have to be a mutually exclusive relationship. That is, power can be routed back into the grid to accommodate a price signal and power can be simultaneously (or successively) routed to a storage device. The many power routing configurations that are possible would be appreciated by one of ordinary skill in the art with the benefit of this disclosure Much of the discussion to this point involved systems configured in a largely autonomous manner, where each control module largely works on its own by executing its own optimization scheme logic without much interaction or input from the other control modules. However, some embodiments can also utilize interactive system configurations, where communications between control modules can be used as inputs for the optimization scheme logic.

Figure 7:
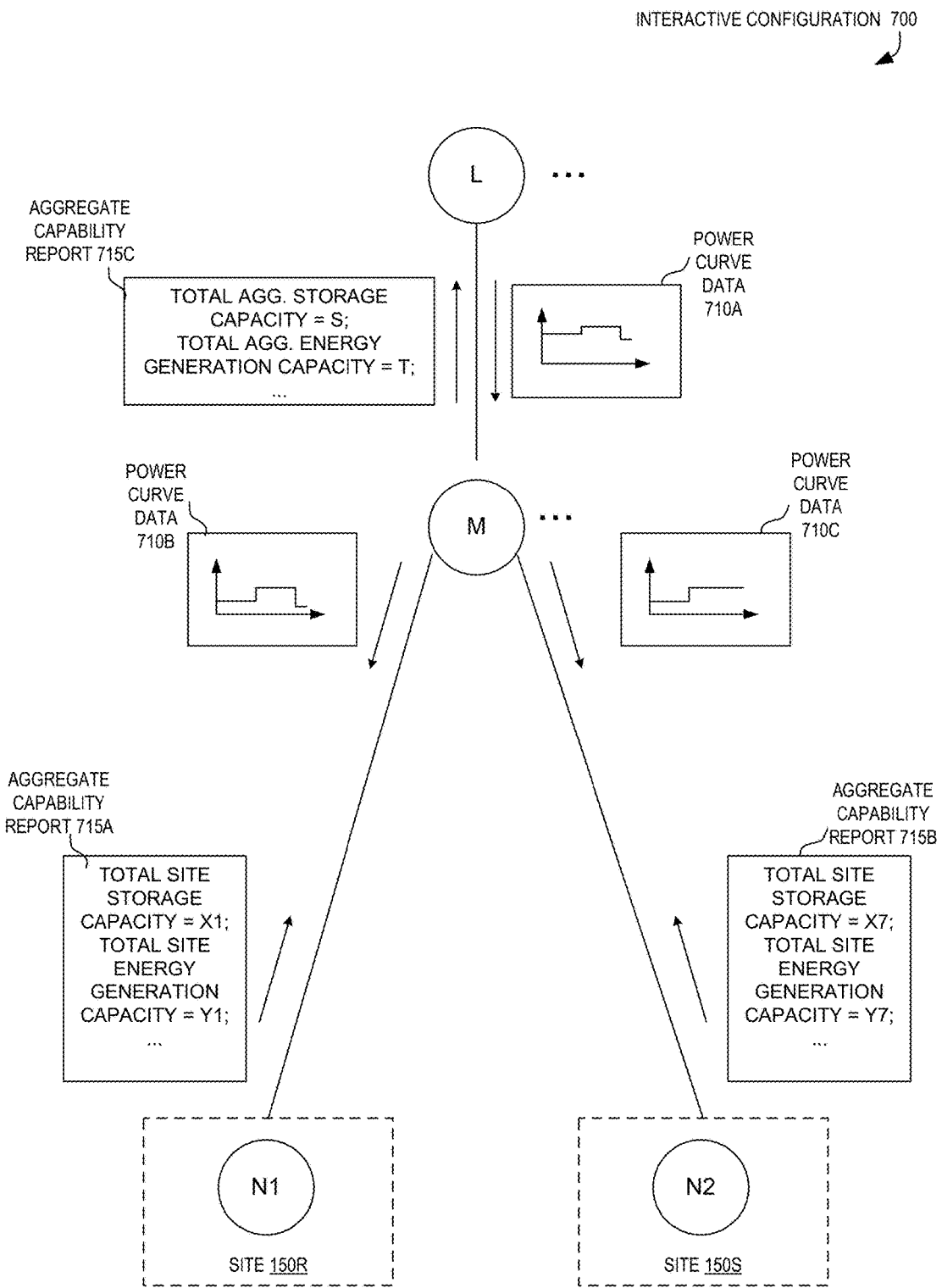
FIG. 7 shows exemplary communications between parent control modules and child control modules in an interactive hierarchical energy distribution grid configuration according to some embodiments.

For example, FIG. 7 shows exemplary communications between parent control modules and child control modules in an interactive hierarchical energy distribution grid configuration 700 according to some embodiments. This shown interactive configuration 700 includes several levels of a control module hierarchy—a first control module 'L', which is a parent to control module 'M.' Additionally, control module 'M' serves as a parent to two control modules 'N1' and 'N2', which are associated with sites 150R and 150S, respectively.

In some embodiments, control modules may be configured to provide site energy capabilities up the hierarchy to parent control modules. For example, control module 'N1' at site 150R can transmit an aggregate capability report 715A to its parent control module 'M'. This aggregate capability report 715A indicates the aggregate energy capabilities of the associated site 150R (and, if control module 'N1' were a parent, the aggregate energy capabilities of its children control modules). For example, the shown aggregate capability report 715A indicates that the aggregate site storage capacity (here, just a site storage capacity from one or more energy storage devices) is a first value X1, an aggregate site energy generation capacity (here, just a site energy generation capacity from one or more site energy generation devices) is a second value Y1, etc.

Similarly, control module 'N2' can also transmit an aggregate capability report 715B to its parent control module 'M', indicating that the aggregate site storage capacity (here, a site storage capacity due to control module 'N2' being a leaf in the hierarchy) has a value of X7, the aggregate energy generation capacity (here, a site energy generation capacity) has a value of Y7, etc. Of course, in other embodiments, aggregate capability reports 715A-715B can include less information, more information, and/or different information about energy generation, storage, and/or load capacity than as depicted herein.

The aggregate capability reports 715A-715B can serve as inputs to the optimization scheme logic at control module 'M', and thusly allow the optimization scheme logic to determine what adjustments can potentially be made at different sites to achieve a configured energy goal. For example, the optimization scheme logic at control module 'M' may determine, to meet an energy goal, that site 150R should attempt to track a first power curve (represented by power curve data 710B) while site 150S should attempt to track a second (possibly different) power curve (represented by power curve data 710C). Thus, in some embodiments, control module 'M' transmits messages to control modules 'N1' and 'N2' indicating desired power curves (as power curve data 710B-710C, respectively). This desired power curve data can be used as an input to the optimization scheme logic implemented by control modules 'N1' and 'N2', which can then attempt to adjust the energy profile of the respective sites to target these desired power curves.

As described throughout this disclosure, in some embodiments these operations may occur at different levels of the hierarchy according to a fractal-like configuration. Thus, in some embodiments, control module 'M' may similarly determine and provide an aggregate capability report 715C to its parent control module 'L' indicating the aggregate energy capabilities available to (e.g., at and under) control module 'M'. For example, the aggregate energy capabilities available to control module 'M' may comprise an aggregation of any energy capabilities at a site associated with control module 'M', together with an aggregation of energy capabilities of all sites associated with control modules existing below control module 'M' in the hierarchy—i.e., site capabilities associated with children control modules 'N1' and 'N2', site capabilities associated with "grandchild" control modules, site capabilities associated with "great-grandchild" control modules, etc. Of course, this configuration benefits from the concept of abstraction of resources, as control module 'M' here receives already-aggregated capabilities from each of its children (encapsulating all capabilities at that associated site and all descendant sites, if any), so it need not be concerned with what capabilities exist further below it in the hierarchy (or what particular devices exist), and need not directly communicate with control modules further below its children control modules in the hierarchy. Thus, in some embodiments, each control module is responsible for aggregating its own site energy capabilities together with aggregate energy capabilities directly reported to it by its own children, and passing this aggregation up in the hierarchy, where those control modules perform the same aggregation and "reporting up."

Similarly, control module 'L' may implement its own optimization scheme logic, using the aggregate capability report 715C data as an input, and determine that control module 'M' is to implement a desired power curve data 710A.

Thus, control module 'M' may utilize this received power curve data 710A and utilize it as an input to its optimization scheme logic (along with, perhaps, the aggregate capability reports 715A-715B) to determine the desired power curves that control modules 'N1' and 'N2' are to target, and provide power curve data 710B-710C accordingly.

Thus, in some embodiments the hierarchy utilizes abstraction and aggregation to remove device specifics, site specifics, and hierarchy specifics from optimization scheme logic decision making. Accordingly, top-level optimization scheme logic decisions can be made simply and quickly using hierarchy-wide aggregated capability data to provide instructions (e.g., desired power curves) to its child control modules. These child control modules can similarly make simple and quick decisions using aggregated capability data to provide instructions down the hierarchy to its child control modules, which can similarly repeat the process throughout the hierarchy.

Figure 8:
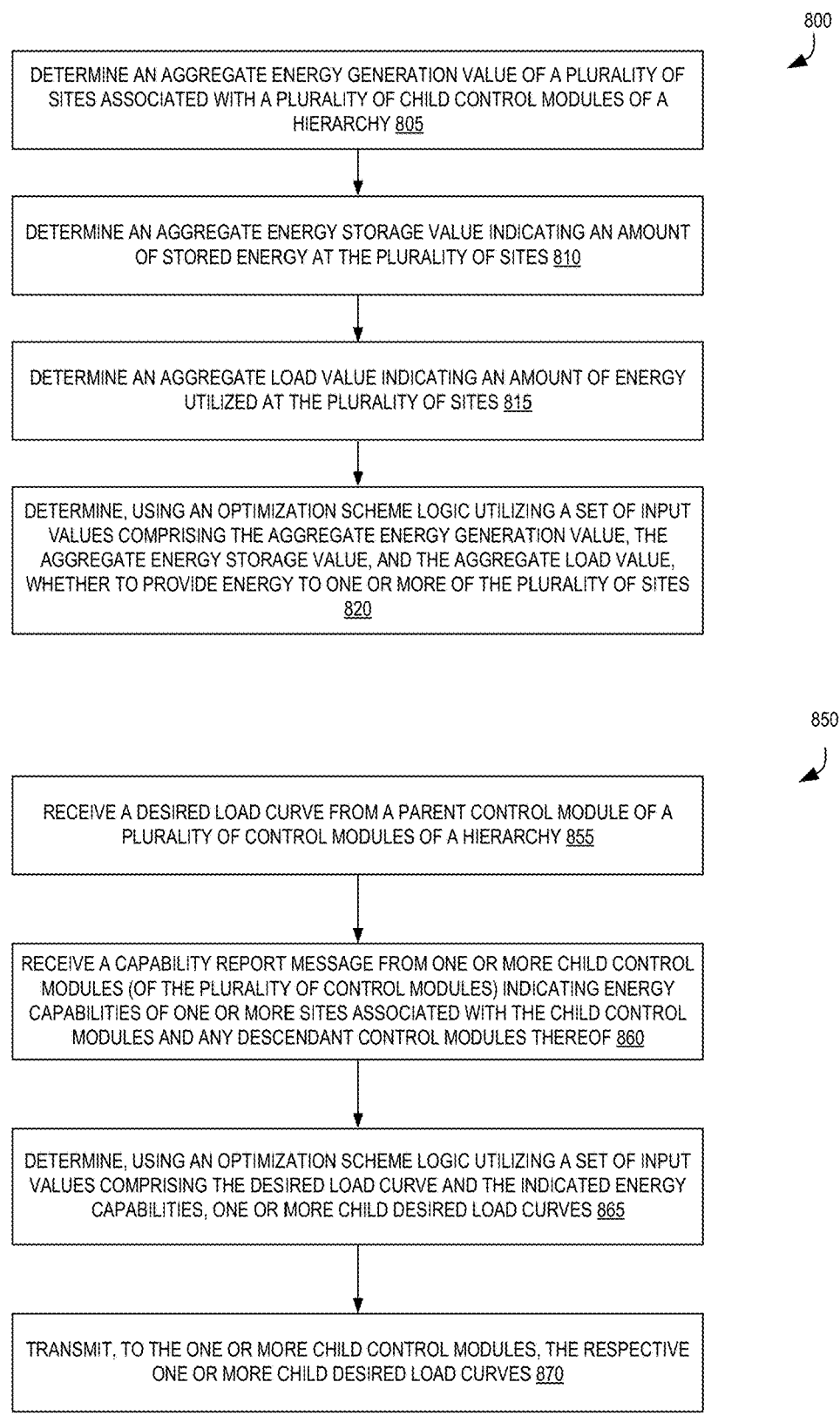
FIG. 8 shows a flow in a control module configured as a parent in a hierarchy of control modules for energy optimization configuration according to some embodiments.
Figure 9:
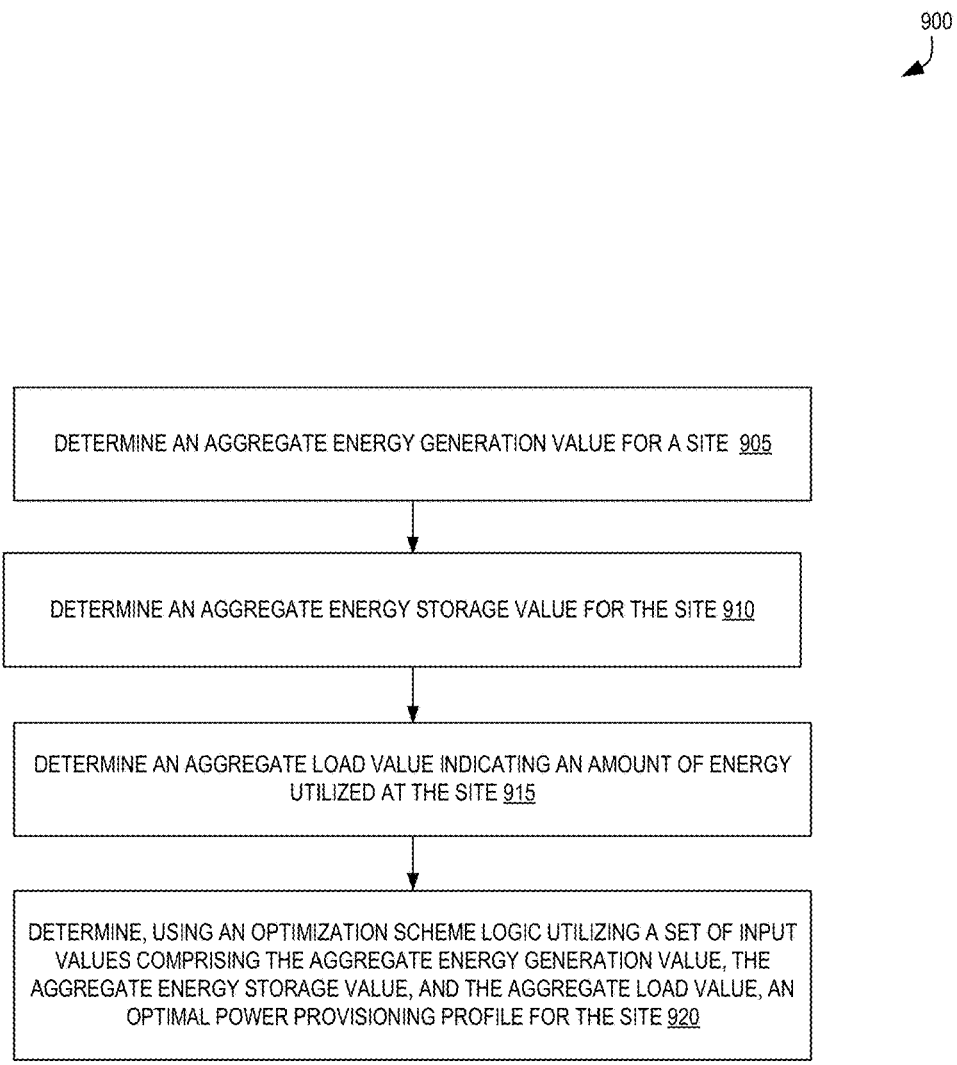
FIG. 9 shows a flow in a control module configured as an independent node in a mesh or hierarchy of control modules for energy optimization configuration according to some embodiments.

FIGS. 8 and 9 show flows (800, 850, 900) in a control module configured as a parent in a hierarchy of control modules for energy optimization configuration according to some embodiments.

The operations of these flows are described with reference to the exemplary embodiments of the other diagrams. However, it should be understood that the operations of these flow diagrams can be performed by embodiments of the invention other than those discussed with reference to these other diagrams, and the embodiments of the invention discussed with reference these other diagrams can perform operations different than those discussed with reference to the flow diagrams. Also, though the flow diagrams in this figure show a particular order of operations performed by certain embodiments, it should be understood that such order is exemplary and thus, alternative embodiments may perform the operations in a different order, combine certain operations, overlap certain operations, remove certain operations, etc.

The first flow 800 can be performed in a control module configured as a parent in a hierarchy of control modules. The flow 800 includes block 805, where the control module determines an aggregate energy generation value of a plurality of sites associated with a plurality of child control modules in the hierarchy. This block 805 can include receiving a message from one or more of the child control modules indicating energy generation values of their associated sites, and can include energy generation values of other control modules further down in the hierarchy serving as descendant (or child, grandchild, etc.) control modules to the sending child control modules.

At block 810, the flow 800 includes determining an aggregate energy storage value indicating an amount of stored energy at the plurality of sites. Block 810 can include receiving a message from one or more of the child control modules indicating energy storage and/or capacity values of their associated sites and aggregate energy storage and/or capacity values of sites of their descendant control modules.

At block 815, the flow 800 includes determining an aggregate load value indicating an amount of energy utilized at the plurality of sites. Block 815 can include receiving a message from one or more of the child control modules indicating energy utilization values of their associated sites and aggregate energy utilization values of sites of their descendant control modules. In some embodiments, block 815 can include monitoring, by the control module at a site, a flow of energy to/from the sites associated with the child control modules.

At block 820, the flow 800 includes determining, using an optimization scheme logic utilizing a set of input values comprising the aggregate energy generation value, the aggregate energy storage value, and the aggregate load value, whether to provide energy to one or more of the plurality of sites. Block 820 can include determining that a net flow of energy between the plurality of sites (associated with the child control modules) and an external energy system exceeds a threshold amount. Block 820 can include determining an energy need amount based upon a difference between the net flow of energy and the threshold amount.

In some embodiments, the flow 800 includes providing the threshold amount of energy from the site to the one or more of the plurality of sites. This providing can include dispatching stored or generated energy from the site associated with the control module to one or more of the sites associated with the child control modules.

The second flow 850 can similarly be performed in a control module configured as a parent and a child in a hierarchy of control modules. In some embodiments, flow 850 can be performed by a control module (e.g., control module 'M') in an interactive system configuration 700 as presented with regard to the concepts of FIG. 7.

Flow 850 includes block 855, where a desired load curve is received from a parent control module (e.g., control module 'L' of FIG. 7) in the hierarchy of control modules. The desired load curve can be generated by the parent control module and indicate a net load curve that should result from the operation of a site associated with the receiving control module (and operations of sites associated with descendant control modules of the receiving control module) to meet an energy goal.

Flow 850 also includes block 860, where a capability report message is received from one or more child control modules (e.g., control modules 'N1' and 'N2' of FIG. 7). The capability report message can indicate energy capabilities of one or more sites (e.g., sites 150R-150S) associated with the child control modules and any descendant control modules thereof. In some embodiments, block 860 occurs prior to block 855, and may be further accompanied by the control module determining aggregate energy capabilities for the site associated with the control module and all sites of descendant control modules, and providing the aggregate energy capabilities to the parent control module in an aggregate capability report (e.g., aggregate capability report 715C). In some embodiments, the desired load curve received in block 855 is generated by the parent control module based upon the aggregate capability report.

Flow 850 also includes block 865, where a determination, using an optimization scheme logic utilizing a set of input values comprising the desired load curve and the indicated energy capabilities, of one or more child desired load curves is made. The one or more child desired load curves may be determined, using the energy capabilities received in block 860 from the child control modules, such that the desired load curve is targeted (e.g., as closely met as possible) upon a successful implementation of the child desired load curves.

At block 870, the respective one or more child desired load curves are transmitted to the one or more child control modules. In some embodiments, the child control modules can use this data as an input into their optimization scheme logic, and as a result adjust their associated site energy profiles and/or create additional desired load curves for any descendant control modules thereof.

FIG. 9 shows flow 900 in a control module configured as an independent node in a mesh or hierarchy of control modules for energy optimization configuration according to some embodiments.

Flow 900 can be performed in a control module configured within a hierarchy of control modules. The flow 900 includes block 905, where the control module determines an aggregate energy generation value associated with the site. The site may include one or more energy generation systems (e.g., solar PV systems, wind power systems, or other system utilizing renewable resources) and/or the site may be associated with a number of separate sites functioning as child nodes with respect to the site with each child site having its own energy generation systems. The energy generation systems of the child nodes may be included in the aggregate energy generation value associated with the site. This block 905 can include receiving a message from its own energy generation systems, one or more of the child control modules indicating energy generation values of their associated sites, as well as energy generation values of other control modules further down in the hierarchy serving as descendant (or child, grandchild, etc.) control modules to the sending child control modules.

At block 910, the flow 900 includes determining an aggregate energy storage value associated with the site. The site may include one or more energy storage systems (e.g., battery systems, flywheel systems, or other system capable of storing energy) and/or the site may be associated with a number of separate sites functioning as child nodes (and possibly descendants therefrom) with respect to the site with each child node having its own energy resources. The energy storage systems of the descendant nodes may be included in the aggregate energy storage value associated with the site. Block 910 can include receiving a message from its own energy storage systems, or one or more of the child control modules indicating energy storage and/or capacity values of their associated sites and aggregate energy storage and/or capacity values of sites of their descendant control modules.

At block 915, the flow 900 includes determining an aggregate load value associated with the site. The site may include multiple loads (e.g., appliances, lights, machinery, etc.) and/or the site may be associated with a number of separate sites functioning as child nodes (and possibly descendants therefrom) with respect to the site with each child node having its own load. The loads for some or all of the descendant nodes may be included in the aggregate load value associated with the site. Block 915 can include receiving a message from its own control module and/or components thereof (e.g., power meters), or one or more of the child control modules indicating energy utilization values (i.e., load values) of their associated sites and aggregate energy utilization values of sites of their descendant control modules. In some embodiments, block 915 can include monitoring, by the control module at a site, a flow of energy to/from the sites associated with the child control modules.

At block 920, the flow 900 includes determining, using an optimization scheme logic utilizing a set of input values comprising the aggregate energy generation value, the aggregate energy storage value, and the aggregate load value, an optimal power provisioning profile for the site. In some embodiments, the site only determines an optimal power provisioning profile for itself. That is, the site may optimize its own load curve (e.g., by flattening or lowering the overall average load) without consideration of its descendant nodes, but it may still utilize the resources associated with the descendant nodes.

In some embodiments, certain nodes may not contribute to aggregate energy generation or storage capacity to parent nodes (i.e., "upstream" nodes). For example, some nodes may include child nodes in their optimization scheme, and some may not because the child node may be designated an independent node or "island" node such that no nodes upstream (parent nodes) and/or downstream (child nodes) can affect or control its own control module. The concept of "independent" or "island" nodes can be applied to any system described in this disclosure.

Devices implementing any of control modules 105A-105N, and some or all of energy resource devices (e.g., generation devices 112A, storage devices 114A, load devices 116A), can utilize any suitable number of subsystems. Examples of such subsystems or components are shown in FIG. 10, which shows a block diagram of an exemplary computer apparatus according to some embodiments.

Figure 10:
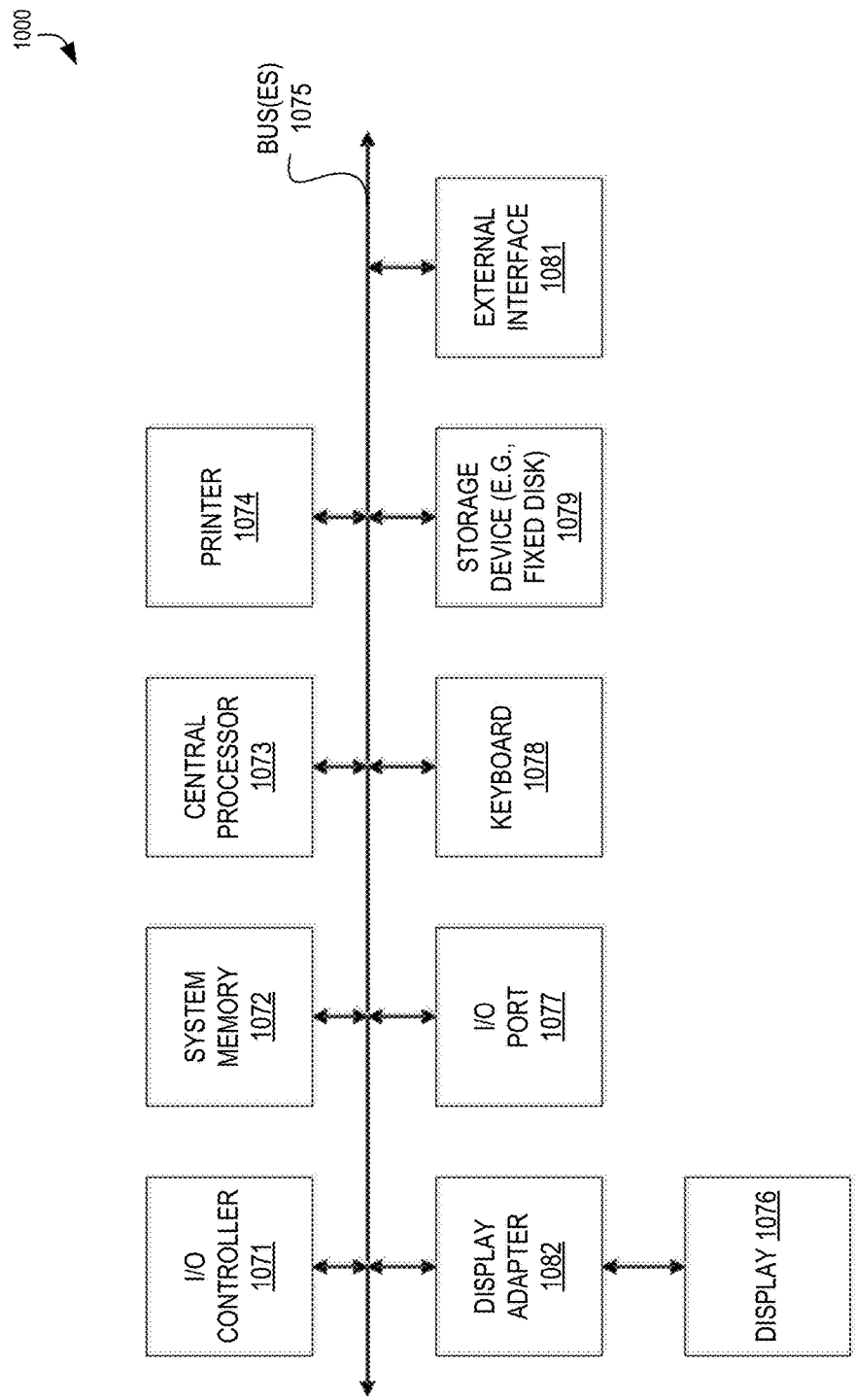
FIG. 10 shows a block diagram of an exemplary computer apparatus according to some embodiments.

The subsystems shown in FIG. 10 are interconnected via a system bus 1075. Additional subsystems such as a printer 1074, keyboard 1078, storage device (e.g., or "fixed disk" such as an optical disk, magnetic disk or "hard drive," flash storage, etc.) 1079, display 1076, which is coupled to display adapter 1082, and others are shown. Peripherals and input/output (I/O) devices, which couple to I/O controller 1071, can be connected to the computer system by any number of means known in the art, such as input/output (I/O) port 1077 (e.g., USB, FireWire®). For example, I/O port 1077 or external interface 1081 (e.g. Ethernet, Wi-Fi, Bluetooth, ZigBee, etc.) can be used to connect the computer apparatus to a local or wide area network such as the Internet, a mouse input device, or a scanner. The interconnection via system bus allows the central processor 1073, which may include one or more processors (or processing units, cores, etc.), to communicate with each subsystem and to control the execution of instructions from system memory 1072 or the storage device 1079, as well as the exchange of information between subsystems. The system memory 1072 and/or the fixed disk 1079 may embody a computer readable medium. Any of the data mentioned herein can be output from one component to another component and can be output to the user.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java®, C++, C, Python, or Perl using, for example, conventional programming techniques, functional programming techniques, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

A recitation of "a", "an" or "the" is intended to mean "one or more" unless specifically indicated to the contrary.

What is claimed is:

1. A distributed electrical grid system, comprising:
   a plurality of control modules arranged in a hierarchy and associated with a corresponding plurality of sites, wherein each control module of the plurality of control modules implements a same optimization scheme logic, having an energy goal, using a set of locally-determined input values to control one or more devices at a site according to the energy goal, the plurality of control modules including at least:
   a first control module configured as a child in the hierarchy, the first control module being associated with a first site and configured to determine a first set of input values comprising an energy generation value of the first site, an energy storage value of the first site, and a load value of the first site, the first control module further configured to provide the first set of input values to the optimization scheme logic of the first control module, wherein the first control module communicates with one or more devices at the first site to adjust an energy profile of the first site according to the energy goal; and
   a second control module configured as a parent in the hierarchy to a set of child control modules including the first control module, the second control module configured to determine a second set of input values comprising an aggregate energy generation value of a set of sites associated with the set of child control modules, an aggregate energy storage value of the set of sites, and an aggregate load value of the set of sites, the second control module further configured to provide the second set of input values to the optimization scheme logic of the second control module, wherein the second control module interacts with the first control module to adjust the energy profile of the first site according to the energy goal.

2. The distributed electrical grid system of claim 1, wherein the energy goal comprises minimizing deviations of a net flow of energy between the first site and an external energy system.

3. The distributed electrical grid system of claim 1, wherein the energy goal comprises minimizing a net flow of energy between the first site and an external energy system and deviations of the net flow of energy between the first site and the external energy system.

4. The distributed electrical grid system of claim 1, wherein:
   the first control module is further configured to determine a plurality of energy cost values associated with exchanging energy with an external energy source at a corresponding plurality of times;
   the plurality of energy cost values are used in the first set of input values of the optimization scheme logic; and
   the energy goal comprises minimizing a cost of energy provided to the first site from the external energy source over a period of time.

5. The distributed electrical grid system of claim 1, wherein the second control module is associated with a second site including at least one of an energy generator device and an energy storage device, and wherein the second control module is further configured to:
   determine that the set of sites associated with the set of child control modules are utilizing, or will utilize, an increase in a net flow of energy into the set of sites; and
   in response to the determination, provide energy from the energy generator device or energy storage device of the second site to at least some of the set of sites.

6. The distributed electrical grid system of claim 1, wherein the one or more devices of the first site comprise a photo-voltaic (PV) device and an energy storage device.

7. The distributed electrical grid system of claim 1, wherein the first control module comprises a site gateway device communicatively coupled with the one or more devices of the first site using wireless communications.

\* \* \* \* \*